US008752853B2

(12) United States Patent  
Fulghum

(10) Patent No.: US 8,752,853 B2
(45) Date of Patent: Jun. 17, 2014

(54) VEHICLE ANTI-THEFT DEVICE

(76) Inventor: David A. Fulghum, Western Springs, IL (US)

(*) Notice: Subject to any disclaimer, the term of this patent is extended or adjusted under 35 U.S.C. 154(b) by 614 days.

(21) Appl. No.: 13/007,079

(22) Filed: Jan. 14, 2011

(65) Prior Publication Data

US 2011/0169245 A1 Jul. 14, 2011

Related U.S. Application Data

(60) Provisional application No. 61/295,017, filed on Jan. 14, 2010, provisional application No. 61/351,411, filed on Jun. 4, 2010.

(51) Int. Cl.
B62K 19/32 (2006.01)
E05B 71/00 (2006.01)
E05B 71/02 (2006.01)
B62H 5/18 (2006.01)
B60T 7/10 (2006.01)

(52) U.S. Cl.
CPC .. *B62H 5/18* (2013.01); *B60T 7/104* (2013.01)
USPC .............................. 280/264; 70/236; 188/265

(58) Field of Classification Search
CPC .................................. B62H 5/18; B60T 7/104
USPC ............ 70/202, 233, 14; 188/265; 280/288.4, 280/297, 200
See application file for complete search history.

(56) References Cited

U.S. PATENT DOCUMENTS

| 677,907 A * | 7/1901 | Vaneleur ........................ 70/233 |
| 2,472,442 A * | 6/1949 | Schueler ........................ 74/489 |
| 3,800,618 A * | 4/1974 | Yoshigai ........................ 74/489 |
| 3,948,361 A | 4/1976 | Carlson |
| 4,426,861 A * | 1/1984 | Chillis ............................. 70/39 |
| 4,708,004 A * | 11/1987 | Allen .............................. 70/226 |
| 5,347,835 A * | 9/1994 | Dewey ............................ 70/202 |
| 5,511,399 A * | 4/1996 | Lynn ................................ 70/19 |
| 5,701,771 A * | 12/1997 | Bailey ............................. 70/233 |
| 5,887,486 A * | 3/1999 | Lin et al. ........................ 74/489 |
| 6,057,657 A | 5/2000 | Kitamura |
| 6,434,979 B1 | 8/2002 | Allen et al. |
| 6,536,246 B2 * | 3/2003 | Wilson et al. ................... 70/233 |
| 6,615,956 B1 * | 9/2003 | Chuang ....................... 188/24.18 |
| 6,622,532 B2 | 9/2003 | Hsu |
| 6,860,128 B2 | 3/2005 | Chappell |
| 2003/0066320 A1 * | 4/2003 | Vito ................................. 70/233 |
| 2010/0206022 A1 * | 8/2010 | Katz et al. ....................... 70/233 |

FOREIGN PATENT DOCUMENTS

| CN | 201086697 | 7/2008 |
| DE | 19522259 | 1/1997 |
| KR | 20-0227840 | 6/2001 |
| KR | 20-0395068 | 9/2005 |
| KR | 10-2009-0020750 | 2/2009 |

* cited by examiner

Primary Examiner — Tony H. Winner
Assistant Examiner — Jacob Knutson
(74) Attorney, Agent, or Firm — Valauskas Corder LLC

(57) ABSTRACT

An anti-theft device for a vehicle having a manual brake system to slow or stop the vehicle is provided. The anti-theft device has a locking mechanism connected to the brake housing and can be placed in a locked position and an unlocked position. An interference member connected to the locking mechanism engages the brake actuating mechanism when in the braking position to maintain vehicle braking. In the unlocked position of the locking mechanism, the interference member is disengaged from the brake actuating mechanism to allow uninterrupted operation of the brake actuating mechanism.

11 Claims, 19 Drawing Sheets

VEHICLE ANTI-THEFT DEVICE

This application claims the benefit of U.S. Provisional Patent Application No. 61/295,017 filed Jan. 14, 2010 and U.S. Provisional Patent Application No. 61/351,411 filed Jun. 4, 2010.

FIELD OF THE INVENTION

The present invention generally relates to an anti-theft device for locking a vehicle's brake system, and more particularly to an anti-theft device by which a vehicle's manually-actuated brake system can be applied and locked in a braking position to limit use of the vehicle.

BACKGROUND OF THE INVENTION

Theft of vehicles employing manually-actuated brake systems is a major concern for owners and users of these vehicles. For the purpose of this application, a vehicle can be any manually operated or motorized vehicle that employs a hand brake, such as a bicycle, moped, or motorcycle. Current estimates indicate that over 1.5 million bicycles are stolen every year in the United States. Major cities are especially prone to bicycle theft since these vehicles are often accessible to many persons when a user of the vehicle is otherwise engaged away from the vehicle. Since there are about 18 million bicycles sold in the United States alone in a given year, it would be desirable to have some form of anti-theft device to deter theft of these and other vehicles utilizing manually-actuated brake systems.

Most vehicles are secured when left unattended with a security device of some arrangement of a chain or bar and a locking device which are secured about a portion of the vehicle to protect the vehicle from being stolen. In many cases the vehicle is locked to or chained to a stationary object such as a post, fence, or bicycle rack. These security devices are not permanently attached to the vehicle and have drawbacks when securing the vehicle since the security devices are not permanently installed on the vehicle.

Most vehicles are stolen because the owner fails to lock or secure the vehicle when it is left unattended, or by a thief breaking or opening the locking device of the security device. In many instances, the thief's operating mode is to quickly and discreetly remove the security device to have use of the vehicle and then ride the vehicle away unnoticed by onlookers. It would be desirable to have an extra anti-theft device that prevented use of a vehicle even in instances where the vehicle was left unsecured to an object or in the event a security device was inappropriately removed from the vehicle.

Few, if any, vehicles are equipped with a theft-deterrent device which is permanently installed on the vehicle at point of manufacture. Moreover, vehicles are not readily designed for easy installation of an anti-theft device after manufacture of the vehicle. Accordingly, it would be desirable to have an anti-theft device that may preferably be permanently installed on a vehicle at time of manufacture or alternatively configured to be added to the vehicle as an add-on accessory that is not expensive to manufacture or difficult to install after manufacture of the vehicle.

It is clear that there is a demand for an anti-theft device and method that is robust, economical, and easily integrated into new or existing vehicles. The present invention satisfies these various demands.

SUMMARY OF THE INVENTION

The present invention provides multiple embodiments of a locking mechanism configured to secure a vehicle having a manual brake system when the vehicle's brake is in a braking position and the locking mechanism is then placed in a locked position. The embodiments of the invention have locking mechanisms that include key and combination lock designs. Some advantages of the embodiments are their simplicity to integrate the locking mechanisms into existing vehicles, low cost and ease of use. Additionally, the locking mechanisms can be permanently installed on the vehicles. The embodiments of the invention are such that the locking mechanisms can be installed at the factory upon manufacture of the vehicle, or alternatively the vehicle can be shipped ready for installation of the locking device at a later time.

In one embodiment, an anti-theft device for a vehicle having a wheel and a manual brake system configured to slow or stop the wheel is provided. The manual brake system includes a manually-actuated brake assembly having a brake actuating mechanism and a brake pad assembly connected via a brake cable. The brake pad assembly is configured to brake the wheel upon actuation of the brake actuating mechanism to a braking position, and disengage from the wheel upon actuation of the brake actuating mechanism to a non-braking position. The anti-theft device has a locking mechanism connected to the brake housing that has a locked position and an unlocked position. The anti-theft device also includes an interference member that is connected to the locking mechanism, wherein in the locking mechanism locked position the interference member engages the brake actuating mechanism when the brake actuating mechanism is in the braking position to continuously brake the wheel. In the locking mechanism unlocked position the interference member is disengaged from the brake actuating mechanism and normal use of the braking system of the vehicle occurs.

In another embodiment of the invention a vehicle is a bicycle that has a frame including a head tube and a rear tube. A fork is rotationally coupled to the head tube, and a handlebar assembly is secured to the fork. Rotation of the handlebar assembly causes rotation of the fork. A front wheel is rotationally coupled to said fork and steers the bicycle when the handlebar assembly is rotated. A rear wheel is rotationally coupled to the rear tube, and may have a pedal and gear assembly connected thereto to power the bicycle upon rotation of a pedal about an axis. A braking system is connected to at least one of the front and rear wheels of the bicycle. The braking system prevents rotation of the braked wheel when the braking system is in a braking position, and permits rotation of the front and rear wheels of the bicycle when the braking system is in a non-braking position.

The bicycle also includes a locking mechanism having a locked position and an unlocked position. When the brake system is in the braking position and the locking mechanism is placed in the locked position, then the locking mechanism maintains the brake system in the braking position until the locking mechanism is unlocked. Accordingly, the embodiments of the invention advantageously deter theft of the vehicle since use of the vehicle is prohibited when the locking mechanism is employed.

BRIEF DESCRIPTION OF THE DRAWINGS

The preferred embodiments of the invention will be described in conjunction with the appended drawings provided to illustrate and not to the limit the invention, where like designations denoted like elements, and in which.

DETAILED DESCRIPTION OF PREFERRED EMBODIMENTS

The invention relates to vehicles having a manual braking system that may be continuously braked by an anti-theft device when the brake system is in a braking position to deter theft of the vehicles. Throughout the discussion of this invention reference will be made to a bicycle as an exemplary vehicle, but the invention is intended not only for bicycles, but motor powered bicycles, tricycles, four wheeled vehicles, motorcycles and any other vehicles having a manual brake system with a manually-actuated brake assembly. The adaptation of the embodiments of the invention to a bicycle in the following examples does not in any way limit the applications of the invention to a bicycle.

Figure 1:
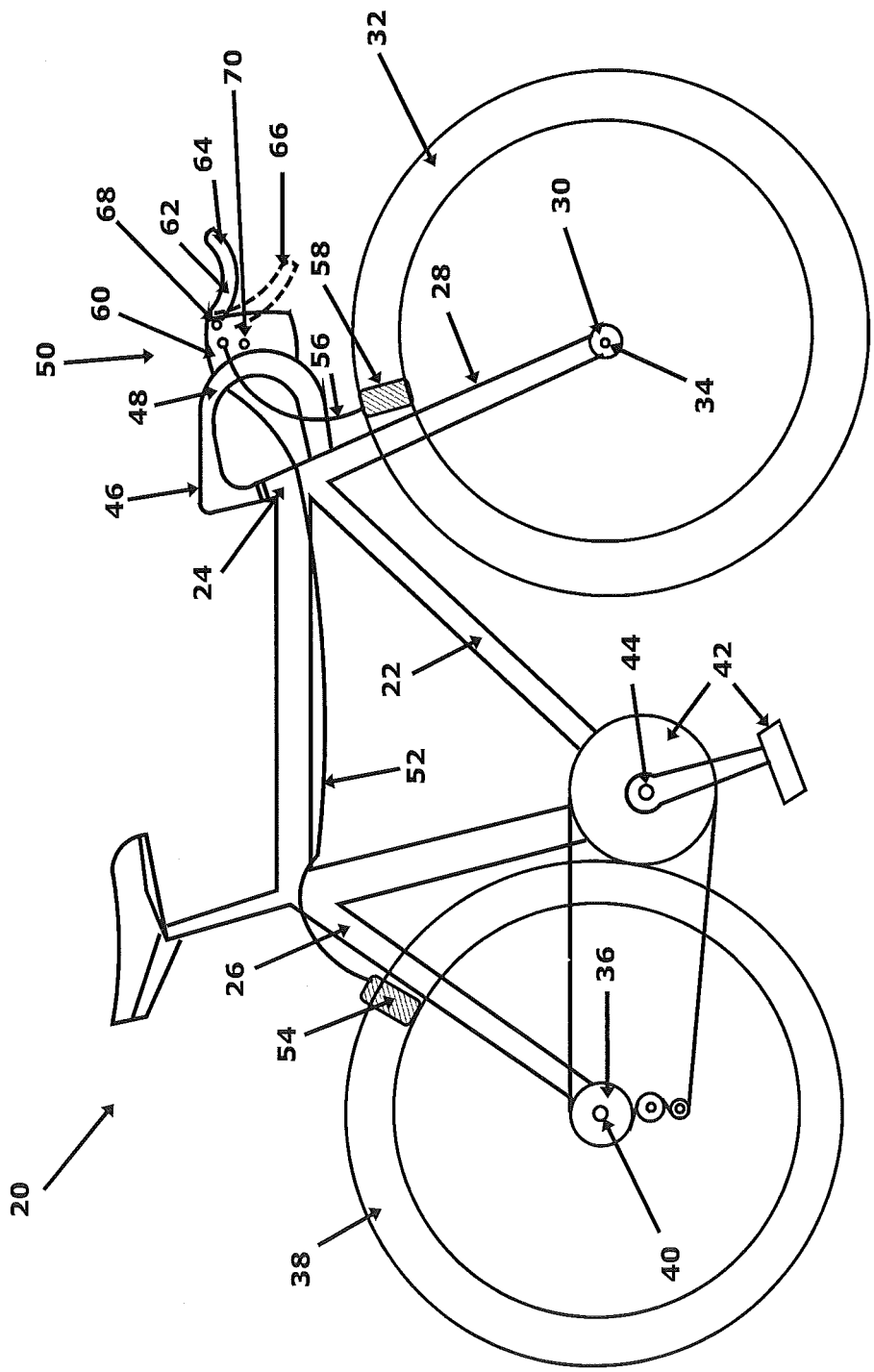
FIG. 1 is a perspective view of a vehicle having an anti-theft device installed thereon.

Turning now to FIG. 1, a vehicle as an exemplary bicycle is shown and designated generally as 20. The bicycle 20 includes a frame 22 that has a head tube 24 and a rear tube 26. A fork 28 is rotationally coupled to said head tube 24 and has a lower end 30 that connects to a front wheel 32 such that the front wheel rotates about a front axle 34. In this manner, the front wheel 32 may be steered to guide the bicycle 20 in a specific direction. The rear tube 26 includes a lower end 36 that connects to a rear wheel 38 via a rear wheel axle 40. The rear wheel 38 may rotate about the rear wheel axle 40 upon rotation of a pedal and chain-linked gear assembly 42 about a pedal axle 44.

The bicycle 20 further includes a handlebar assembly 46 which preferably secures to the fork 28 to facilitate steering and braking of the bicycle. Typically, the handlebar assembly 46 will have a pair of handles 48 (one shown) that attach to a manual brake system, which is shown generally as 50. One of the handles 48 is connected via a rear brake cable 52 to a rear brake pad assembly 54 and the other handle 48 is connected via a front brake cable 56 to a front brake pad assembly 58. The manual brake system 50 may include a manually-actuated brake assembly 60 which includes one or more brake actuating mechanisms or manually-actuated levers 62 (one shown) that are connected to a respective brake cable 52, 56 and brake pad assembly 54, 58. The brake assembly 60 is configured to slow or stop a wheel 32, 38 upon actuating of a respective lever 62 to a braking position and disengage from the wheel upon actuation of the lever to a non-braking position.

The levers 62 are capable of being manually actuated from a non-braking position 64 in which no braking of the bicycle 20 occurs to braking position 66 (shown in dashed lines) in which one or both of the brake pad assemblies 54, 58 are actuated to engage the wheels 32, 38 and brake the bicycle 20. Accordingly, the braking system 50 prevents rotation of one or both of the wheels 32, 38 depending on user selection of braking of the bicycle 20. Actuation of a lever 62 causes the brake cable 52 or 56 to actuate which causes braking by the respective brake pad assembly 54, 58. Brake cables 52, 56 commonly used in the industry typically include two brake members: a first brake member and a second brake member. One brake member moves during brake actuation and is placed in tension whereas the other brake member is generally fixed during brake actuation and provides the equal and opposite compressive force required for normal braking function. In normal use of the bicycle 20, the lever 62 is pivotable about a pivot point 68 and generally remains in the non-braking position 64 unless manually actuated by a user. While the present embodiment of a bicycle is directed to a pair of separate manually-actuated levers 62, it is contemplated that in other embodiments that a single lever may be used to slow or stop the bicycle 20. The bicycle 20 also includes an anti-theft device 70 which can be placed in a locked position to maintain the levers 62 in a braking position to deter theft of the bicycle.

Figure 2A:
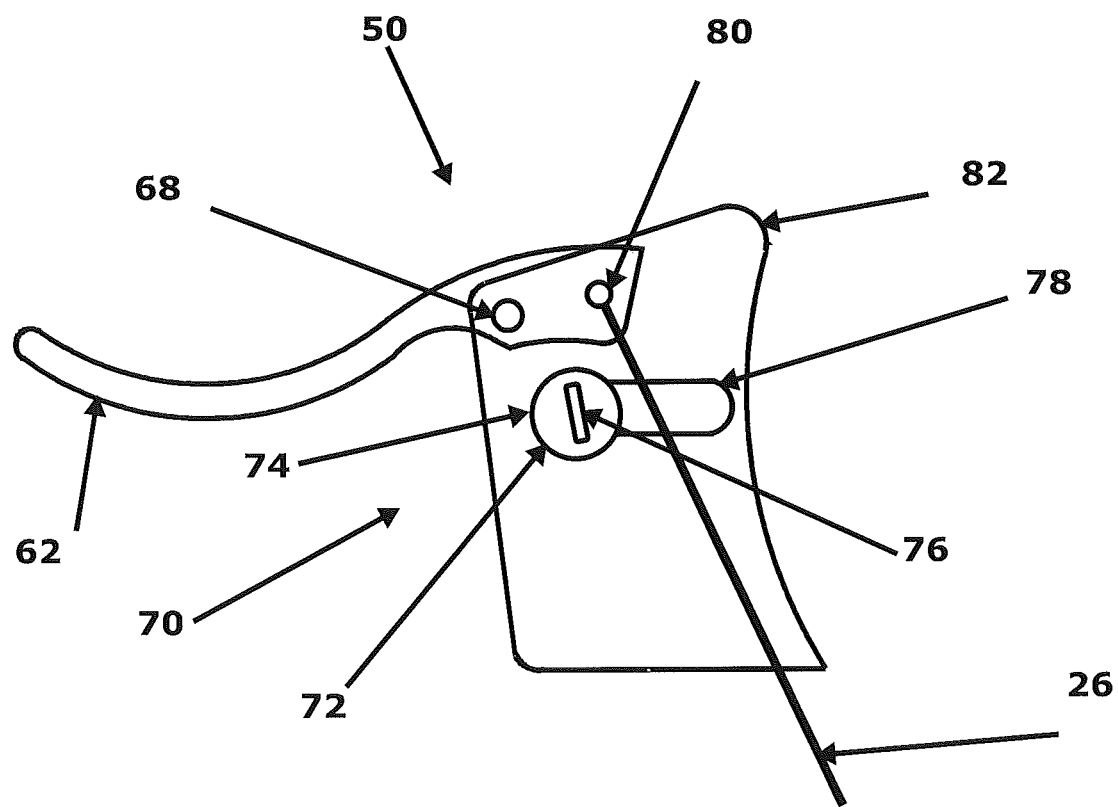
FIG. 2A is a side view of a first embodiment of an anti-theft device having a locking mechanism in an unlocked position according to a first embodiment of the invention.
Figure 2B:
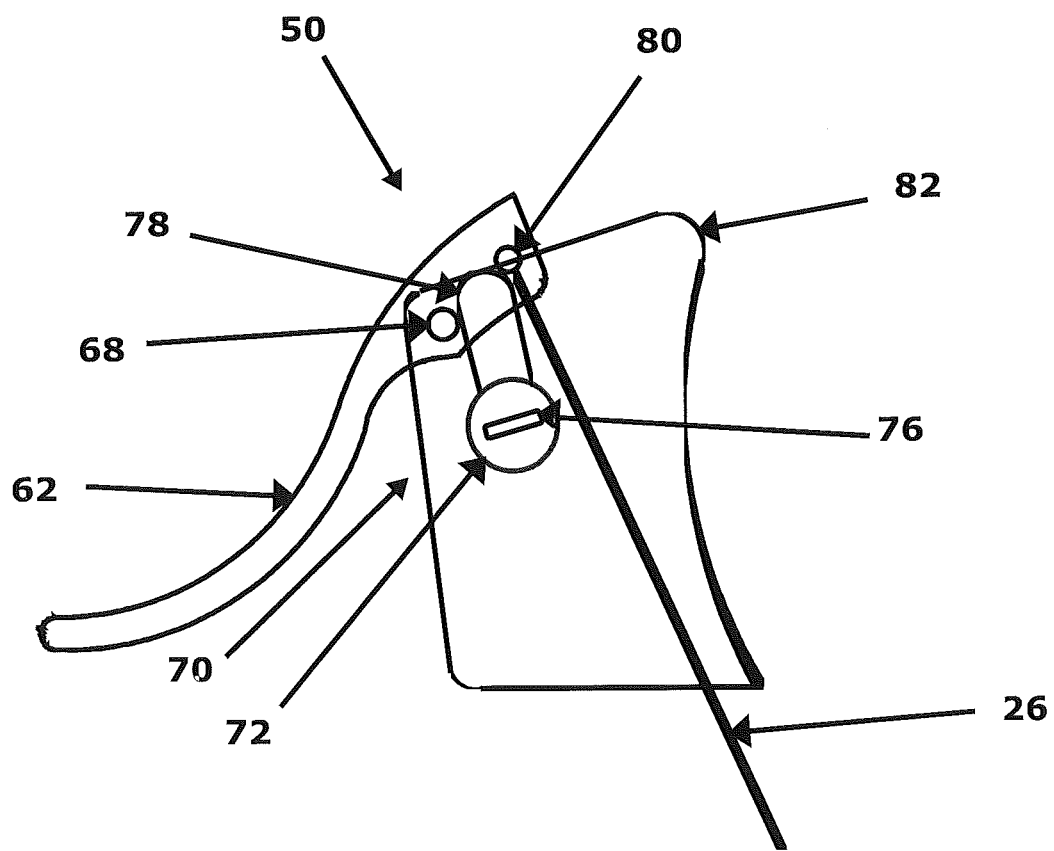
FIG. 2B is a side view of the anti-theft device of FIG. 2A having a locking mechanism in a locked position.

FIG. 2A illustrates one embodiment of an anti-theft device 70 that includes a locking mechanism 72. The locking mechanism 72 is shown in an unlocked position, but can be positioned in a locked position as shown in FIG. 2B. The locking mechanism 72 includes a shell 74 that is configured to receive a key 76. The anti-theft device 70 also includes an interference member 78 that may be rotated by rotation of the key 76. In the present embodiment, the interference member is a cam locking member. However, the interference member 78 may be any structure that is capable of preventing movement of the lever 62 when the lever is placed in a braking position. When the key 76 is rotated to a locked position, the interference member 78 is rotated to engage the lever 62. In FIG. 2A, the key 76 is in an open position and the interference member 78 is not engaged with the lever 62. In this key open position a user may actuate the lever 62 about the pivot point 68 which causes the rear brake cable 26 attached to the lever at an attachment member 80 to actuate when the handle is pivoted. When the interference member 78 is in the unlocked position, then braking and non-braking of the bicycle 20 using the braking system 50 may occur as is known to those skilled in the art.

The anti-theft device shown in the present embodiment and other embodiments detailed below may be installed on both brake actuating mechanisms. In order to accommodate for the opposite sides (i.e., left and right sides) of a bicycle, a right hand and left hand version of the locking mechanism is preferred. The figures show herein will illustrate either a right hand or a left hand embodiment of the locking device, however it is understood that their mirror images can be implemented as locking mechanisms as is known to those skilled in the art of bicycle design.

In FIG. 2B, the lever 62 is in a braking position and the interference member 78 is rotated and engaging the lever. In this figure the locking mechanism 72 is in the locked position and the lever 62 is fixed in a braking position. The interference member 78 contacts the surface of the lever 62 holding the lever in the braking position and causing braking to be continually applied to the bicycle 20 until the key 76 is rotated to the unlocked position of the locking mechanism 72.

Accordingly, should someone attempt to steal the bicycle 20 when the locking mechanism 72 is in the locked position, then the bicycle would not be able to be operated or ridden. Thus, the anti-theft device 70 prevents thieves from breaking or removing a lock attaching a bicycle to a structure and then pretending to be an owner of the bicycle by using the bicycle to leave a location. In this circumstance, a thief would need to conspicuously carry a bicycle away to complete a theft which would be noticeable by a passerby. Moreover, even if a thief was able to remove the bicycle from the location, it would be less desirable to take the bicycle since the locking mechanism 72 would need to be unlocked before the bicycle 20 could be properly used.

As shown in FIGS. 2A and 2B, the locking mechanism 72 is connected to a brake housing 82 of the braking system 50. The locking mechanism 72 may be integrated into the brake housing 82 as a single unit or alternatively configured to slide into the brake housing and be secured thereto.

Figure 3:
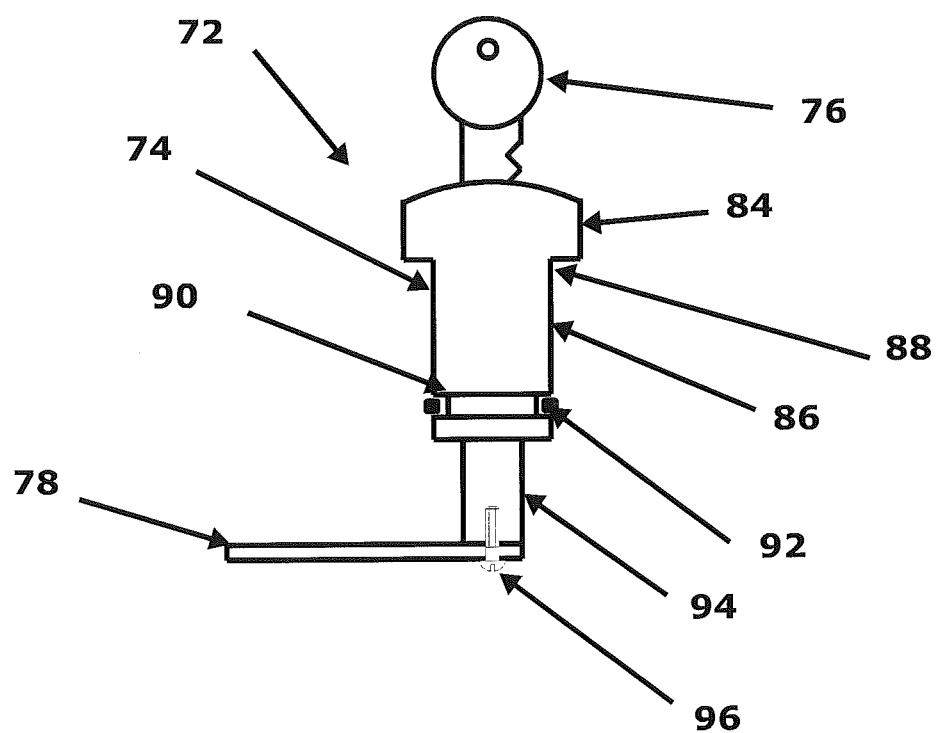
FIG. 3 is a side view of the locking mechanism according to the first embodiment of the invention.

FIG. 3 shows a side view of the locking mechanism 72 with the key 76 partially inserted therein. The locking mechanism 72 is designed to be placed within an opening of the brake housing 82, and may be placed within the opening either at the time of manufacturing the bicycle or alternatively at a later time as an add-on accessory. The shell 74 of the locking mechanism 72 includes a head member 84 receiving the key 76 and an end member 86. The head member 84 defines a shoulder 88 that is configured to engage the brake housing 82 so as to prevent the locking mechanism from sliding completely within the brake housing.

The end member 86 includes an annular groove 90 that is configured to receive a securing member 92. The securing member 92 may be an elastomer member formed of rubber or other deformable material that can deform while the locking mechanism 72 is being inserted into the brake housing 82 and expand after the shoulder 88 is adjacent the brake housing. The expansion of the securing member 92 fixes the locking mechanism 72 to the brake housing 82 of the brake system 50 and prevents removal of the locking mechanism from the brake housing.

The locking mechanism 72 also includes a cylinder plug 94 that is inserted within the end member 86 and configured to rotate relative to the shell 74. The cylinder plug 94 may be a typical cylinder plug for a key-type lock as is known to those skilled in the art of lock design. The cylinder plug 94 is connected to the interference member 78 via a fastener, which is shown as screw 96.

Figure 4:
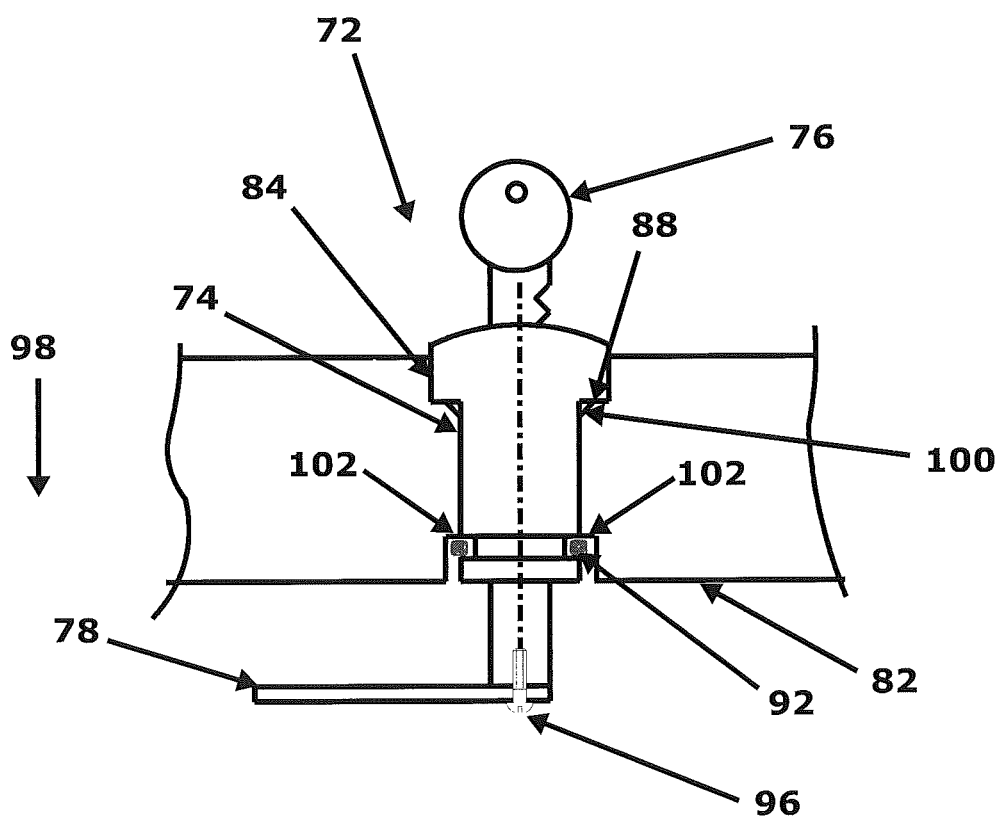
FIG. 4 is a side view of the locking mechanism mounted in a brake housing according to the first embodiment of the invention.

FIG. 4 shows the locking mechanism 72 secured to the brake housing 82. The locking mechanism 72 is inserted within the brake housing 82 in the direction of arrow 98 until the shoulder 88 of the locking mechanism contacts an upper portion 100 of the brake housing. The securing member 92 then expands and contacts a lower portion 102 of the brake housing 82 to fix the locking mechanism 72 to the brake housing.

Figure 5:
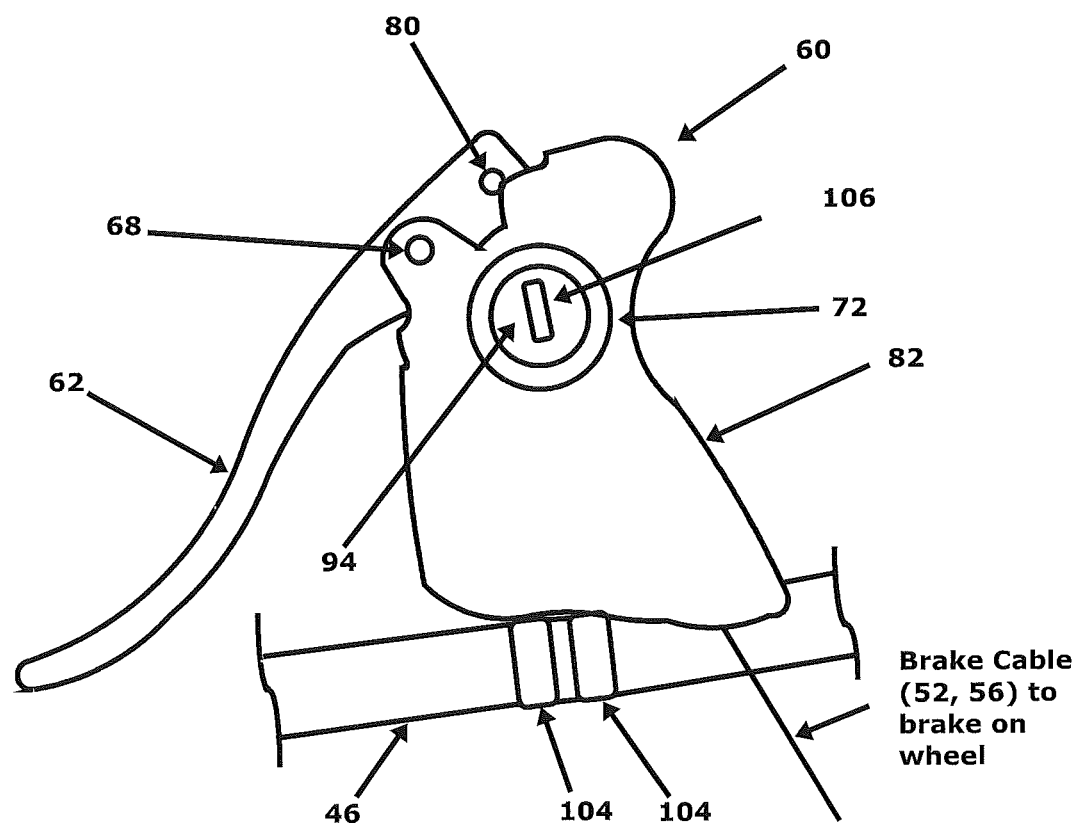
FIG. 5 is a perspective view of the anti-theft device secured to a handlebar assembly according to the first embodiment of the invention.

FIG. 5 shows the manually-actuated brake assembly 60 secured to the handlebar assembly 46 via a pair of clamps 104. The locking mechanism 72 includes a keyhole 106 which is adapted to receive the key 76. Upon insertion of the key 76 into the locking mechanism 72, the keyhole 106 and cylinder plug 94 can rotate clockwise or counter clockwise to the locked and unlocked positions of the locking mechanism and similarly rotate the interference member 78 since the key may engage the cylinder plug.

Figure 6:
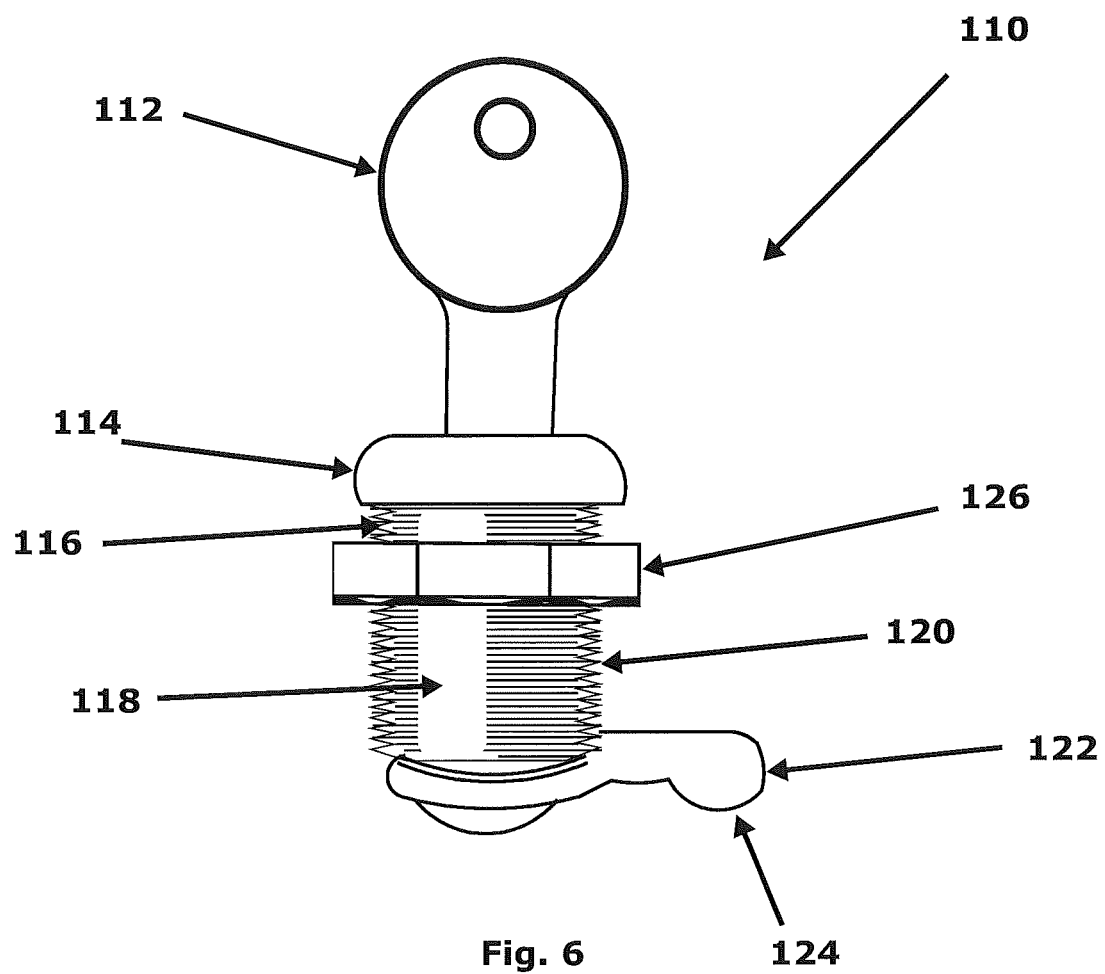
FIG. 6 is a perspective view of the locking mechanism of a second embodiment of an anti-theft device according to the invention.

FIG. 6 illustrates an exemplary embodiment of a locking mechanism 110 that has a key 112 inserted within a head portion 114. Unlike the earlier locking mechanism 72, the present locking mechanism 110 includes an end member 116 that has a planar surface portion 118 and a threaded portion 120. The planar surface portion 118 is provided as a guide for inserting the locking mechanism 110 in a correct orientation into the housing body 82 of the brake system 50. In alternative embodiments, the planar surface portion 118 can be replaced with a groove or protrusion which aligns the locking mechanism 110 and brake housing 82 relative to one another.

The locking mechanism 110 connects to an interference member 122 that is formed to have an arcuate end part 124. The locking mechanism 110 includes a fastener such as nut 126 that is configured to engage and be threaded onto the threaded surface 120 of the end member 116. The nut 126 facilitates securing of the locking mechanism 110 to the brake housing 82.

Figure 7:
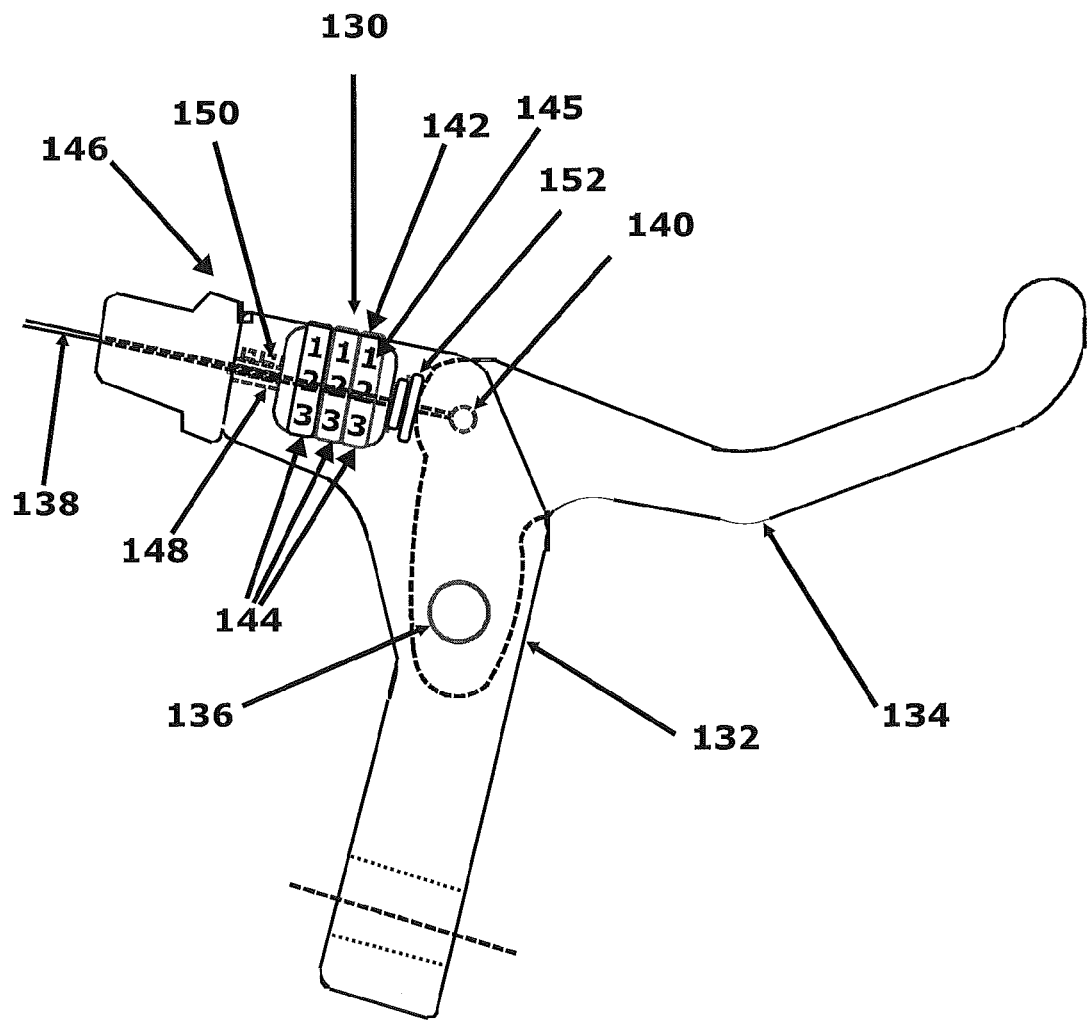
FIG. 7 is a side view of a third embodiment of an anti-theft device according to the invention.

Turning now to FIG. 7, an alternative embodiment of a locking mechanism 130 is shown. A brake assembly body 132 includes a lever 134 which may be pivoted about a pivot 136. A brake cable 138 passes through the locking mechanism 130 and is connected to the lever 134 via an attachment mechanism 140. Actuation of the lever 134 causes actuation of the brake cable 138.

The locking mechanism 130 has a combination lock 142 that includes a plurality of rotary combination rings 144. The present combination lock has three rotary combination rings, but any number of rings is contemplated. Each of the combination rings has identifiers, such as numbers 145, which facilitate different lock combinations as is known to those skilled in the art of lock design. An interference member 146 connected to the locking mechanism 130 includes a locking slide member 148. The locking slide member 148 has teeth 150 and may slide into the combination lock 142 when the lever 134 is actuated about the pivot 136. The locking mechanism 130 has a magnet 152 adjacent the combination lock that magnetically attracts the locking slide member toward the magnet. The magnet 152 has a hole which allows the brake cable 138 to pass therethrough.

The locking slide member 148 slides to through the center of the combination lock 142 as the lever 134 is actuated. The teeth 150 of the locking slide member 148 may be locked in place by the rotary combination rings 144 which are part of the combination lock 142. The brake cable 138 is inserted through a hole (not shown) at or near the center of the locking slide member 148 and attached to the lever 134 at the attaching member 140. The magnet 152 is located between the locking slide member 148 and the lever 134. When the brake lever 134 is actuated the magnet 152 pulls the locking slide member 148 through the combination lock 142 (to the right in FIG. 7) so that the combination lock's rotary combination rings 144 can be set (rotated) to engage the locking teeth 150 and prevent the locking slide member from moving to the left in FIG. 7. The engagement of the rotary combination rings 144 to the teeth 150 holds the brake lever 134 in the braking position. In an unlocked position of the locking mechanism 130, the combination lock 142 disengages from the teeth 150 of the locking slide member 148.

In the situation where the rotary combination rings 144 are inadvertently rotated to the locked position when the brake pad assembly 54, 58 is disengaged and a rider attempts to slow or stop the bicycle, then the magnet 152 releases from the locking slide member 148 and allows the brake pad assembly to apply braking even though the combination lock 142 is in the locked position.

Figure 8A:
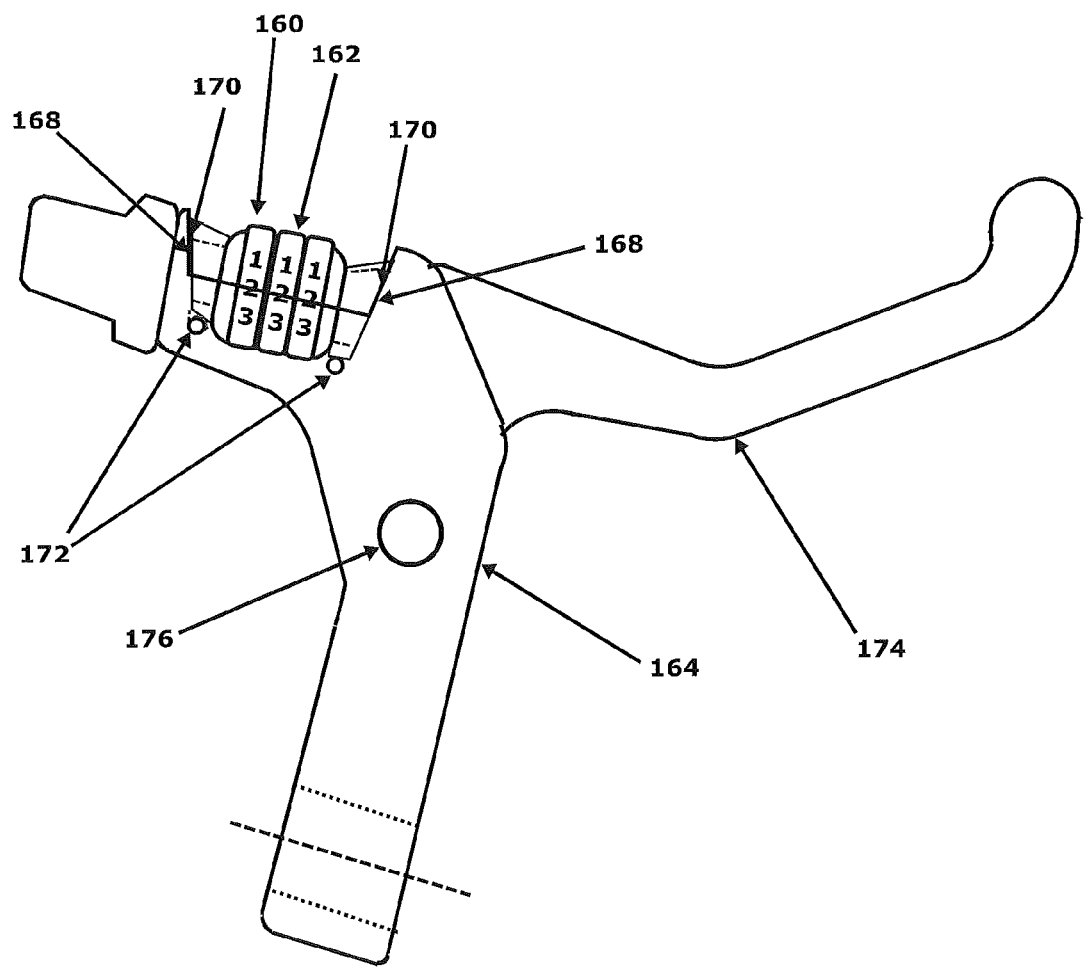
FIG. 8A is a side view of a fourth embodiment of an anti-theft device with a portion of the brake housing removed.
Figure 8B:
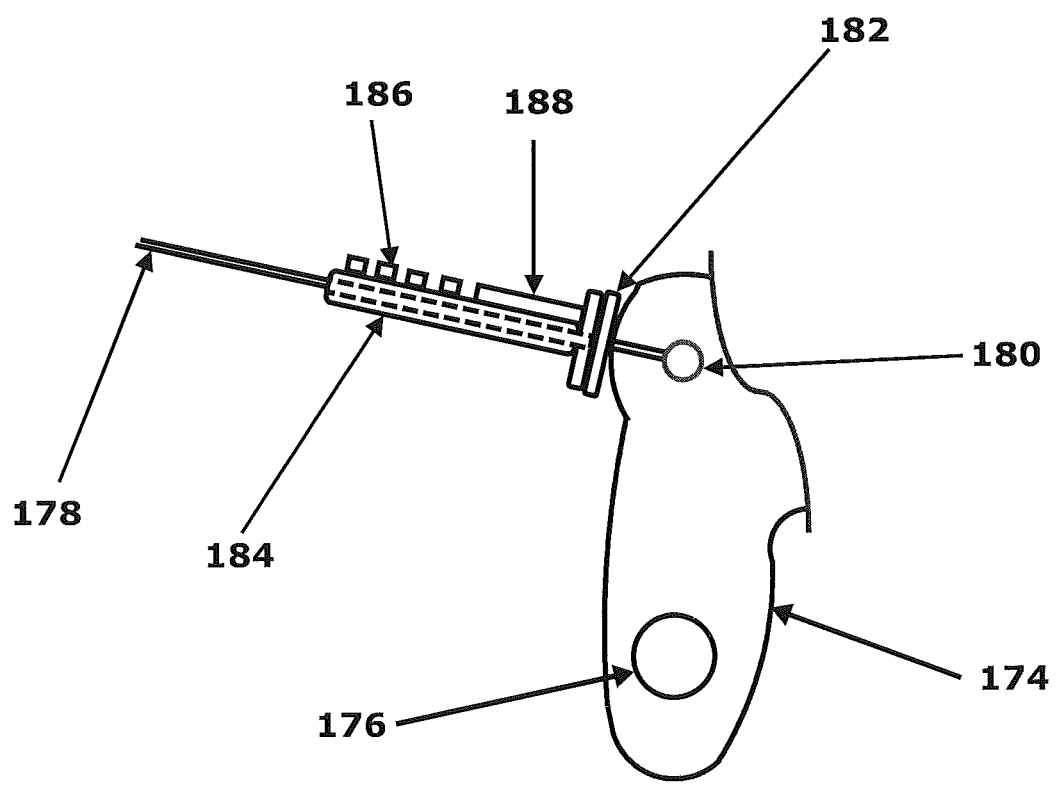
FIG. 8B is a side view of a locking slide member of the fourth embodiment of the invention.

FIGS. 8A and 8B are side views of the alternative embodiment of a locking mechanism 160 showing the mounting of a combination lock 162 in a brake housing 164. The brake housing 164 has angled surfaces 168, which match similar angled surfaces 170 of the combination lock 162. The brake housing 164 also has mounting apertures (not shown), which match mounting apertures 172 of the combination lock 162 when the combination lock is positioned within the brake housing. Fasteners, such as pins, screws, bolts, etc. (not shown) are inserted into the mounting apertures 172 to secure the combination lock 162 to the brake housing 164. A lever 174 and pivot 176 are also shown.

Operation of the combination lock 162 and locking of a brake cable 178 are similar to that described with respect and the embodiment of FIG. 7. The brake cable 178 passes through the locking mechanism 160 and attaches to the lever 174 at an attachment member 180. A magnet 182 is provided between the lever 174 and a locking sliding member 184. As shown in FIG. 8B, the locking slide member 184 has teeth 186 which engage the rotary combination rings 144 (see FIG. 7). In this embodiment, the locking slide member 184 has teeth 186 for only a part of its length. For the balance of the locking slide member's length at area 188, there are no teeth. This feature prevents the rotary combination rings 144 from being rotated when the lever 174 is in the non-braking position.

Figure 9:
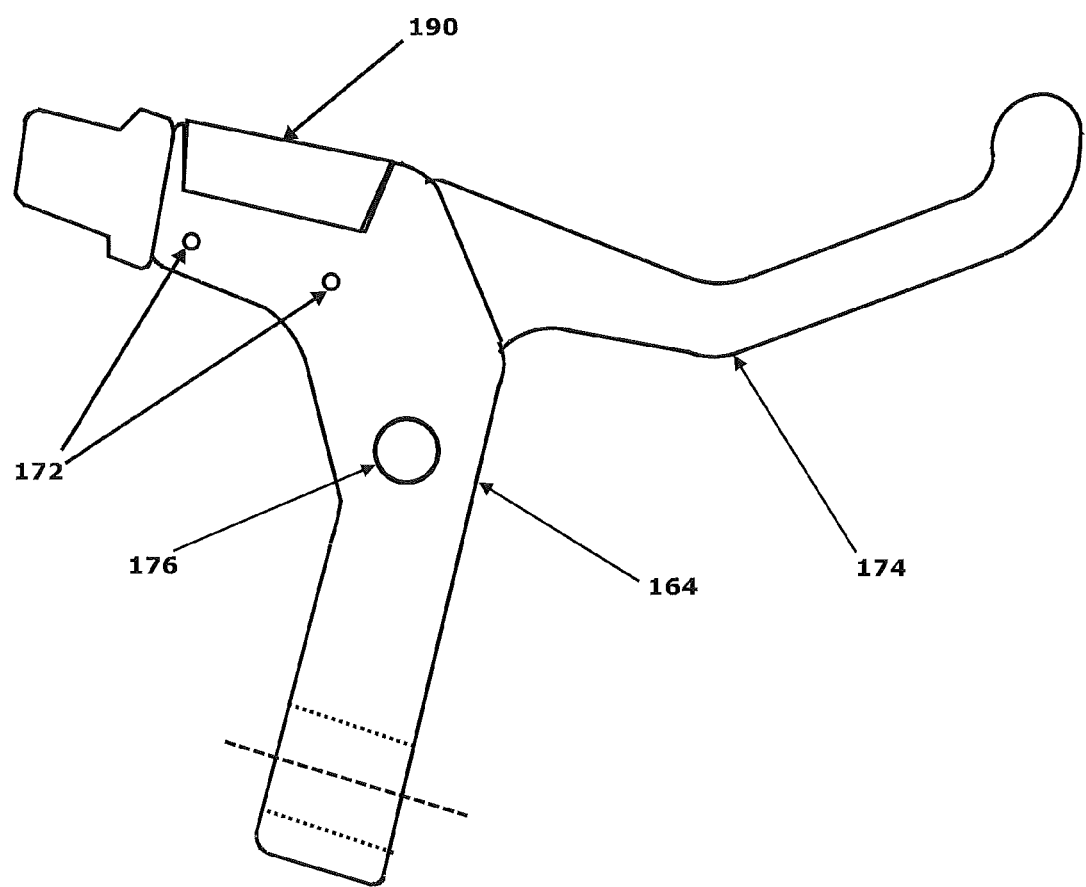
FIG. 9 is a side view of an optional cover replacing the combination lock of FIG. 8A according to the fourth embodiment of the invention.

FIG. 9 shows a view of FIG. 8 with the locking mechanism 160 removed. In this example, a bicycle 20 may be manufactured without a locking mechanism and shipped to a retailer. The retailer may then offer the locking mechanism 160 as an add-on feature to customers. Preferably, the brake housing 164 includes a cover 190 that protects the opening where locking mechanism may be installed.

Figure 10:
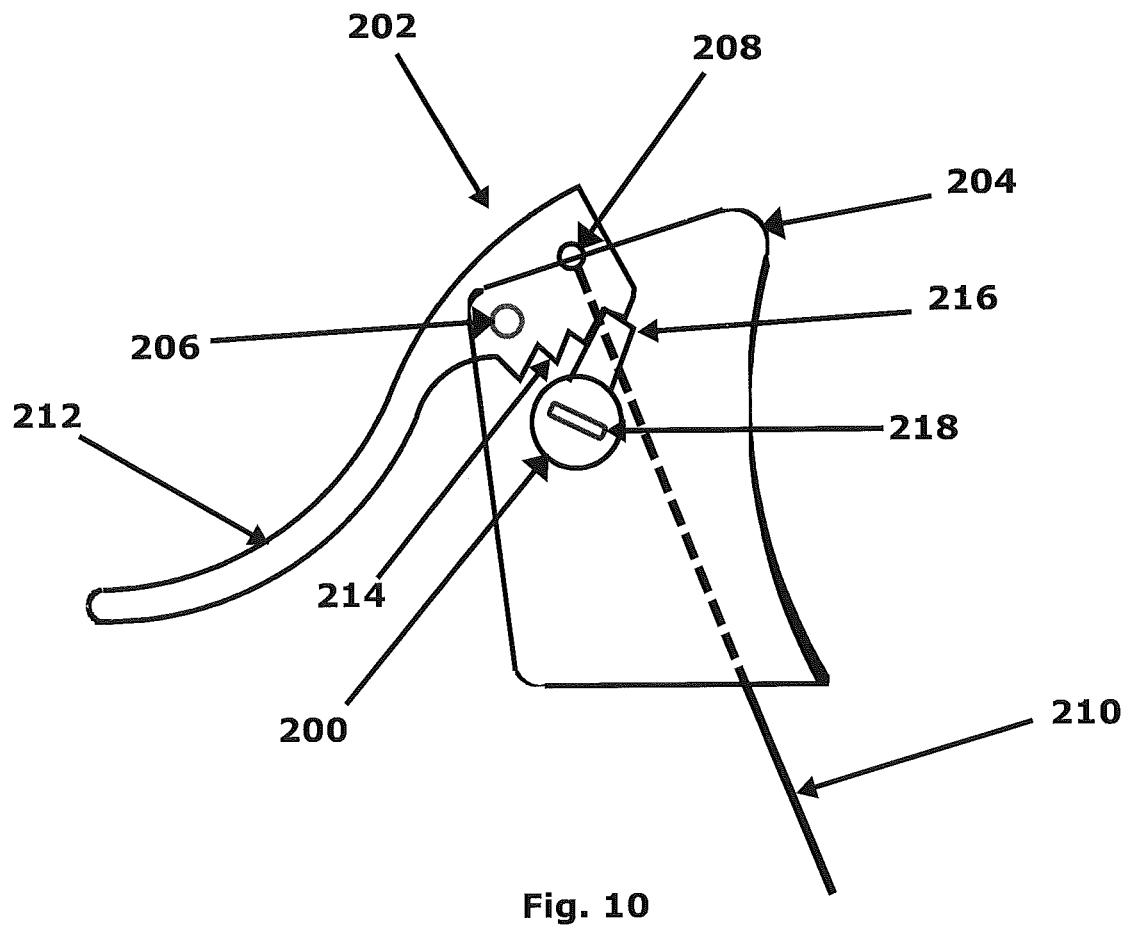
FIG. 10 is a side view of an anti-theft device according to a fifth embodiment of the invention.
Figure 11:
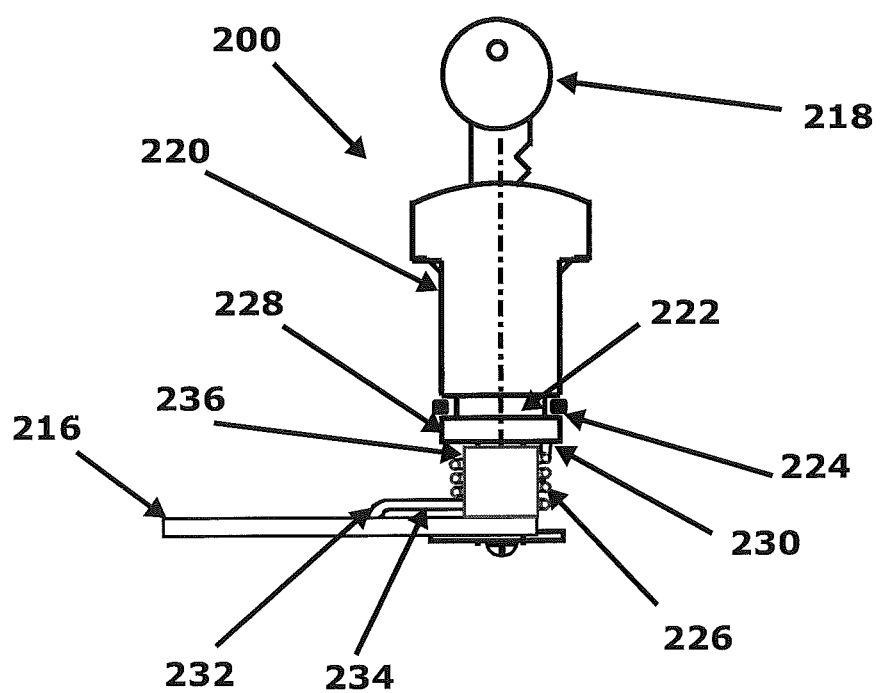
FIG. 11 is a side view of the locking mechanism of a fifth embodiment of an anti-theft device of the invention.

FIGS. 10 and 11 illustrate an alternative embodiment of a locking mechanism 200 that is connected to a brake actuating mechanism 202. In this embodiment the brake housing 204, pivot 206, attachment mechanism 208, and brake cable 210 are similar to those described in the embodiment of FIG. 2. One difference between the embodiment of FIG. 2 and the present embodiment is that a lever 212 includes notches 214 that can be engaged by an interference member 216 to lock the lever in different braking positions depending on how far a key 218 is rotated. This notched arrangement of the lever 212 permits varying tension to be applied to the brake cable 210 and allows a user of the locking mechanism 200 to select appropriate braking of the brake actuating mechanism 202.

The locking mechanism 200 includes a shell 220 similar to the embodiment of FIG. 2, and has an annular groove 222 configured to receive a securing member 224. To facilitate engagement of the interference member 216 to the notches 214 of the lever 212, a bias member such as spring 226 is seated between the interference member and an end member 228 of the locking mechanism 200. One end 230 of the spring 226 is connected to the end member 228 and the other end 232 is in contact with the interference member 216. The other end 232 of the spring 226 has an adjacent extending portion 234 that provides rotational bias to the interference member 216 since the spring is assembled to the locking mechanism 200 in a biased manner. Thus, the interference member 216 receives a torsional force applied by the spring 226 in a counter clockwise direction as viewed in FIG. 10 which rotates the interference member toward the notches 214 of the lever 212 when the key 218 is turned to a locked position.

In this embodiment, the interference member 216 is mounted to a cylinder plug 236 which rotates within the shell 220 upon rotation of the key 218. A substantial portion of the spring 226 encircles the cylinder plug 236. As is known those skilled in the art, the particular thickness, number of coils, and materials forming the spring can vary to provide a desired range of torsion to be applied to the interference member 216. When the key 218 is turned to the locked position the interference member 216 contacts the first notch 214 as shown in FIG. 10. As the lever 212 is actuated toward an increased braking position (i.e., in a counter clockwise direction about the pivot 206) causing additional actuation of the brake cable 210, the interference member 216 will rotate counter clockwise from the first notch to the second and third notches depending on the amount of actuation of the lever. The interference member 216 is rotated in the counter clockwise direction by the torsional force applied to the interference member by the spring 226.

Figure 12:
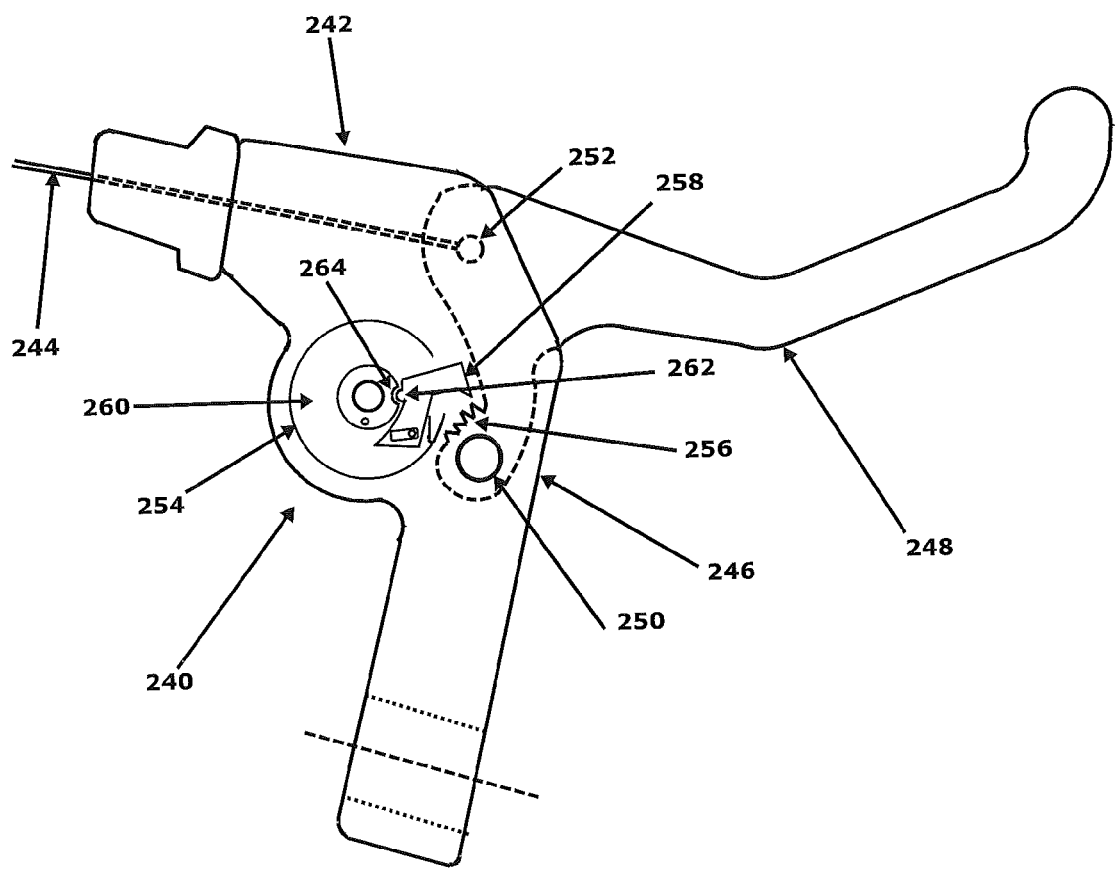
FIG. 12 is a side view of an anti-theft device according to a sixth embodiment of the invention.
Figure 13:
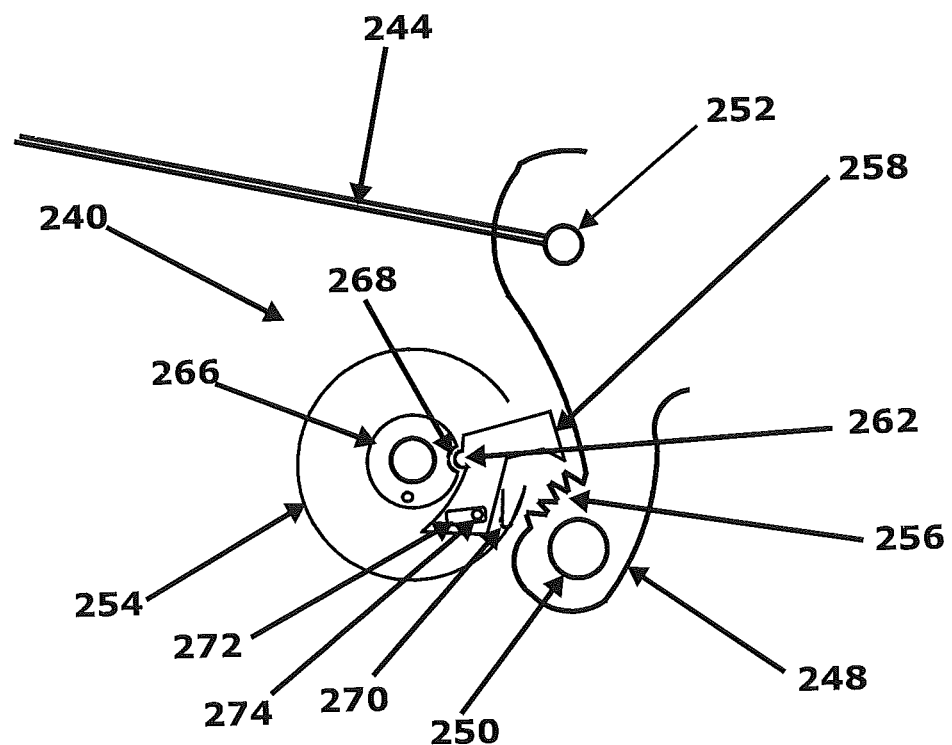
FIG. 13 is a side view of internal components of a rotary combination lock according to the sixth embodiment of the invention.

FIGS. 12 and 13 are side views of another embodiment of a locking mechanism 240 and manually-actuated brake assembly 242. The brake assembly 242 includes a brake cable 244, brake housing 246, and brake actuating mechanism 248 which pivots about the pivot 250. The brake cable 244 is secured to the brake actuating mechanism 248 via the attachment mechanism 252 and actuates the brake pad assembly (FIG. 1) upon actuation of the brake actuating mechanism.

The locking mechanism 240 has a rotary dial combination lock 254 that is installed on the brake housing 246. The brake actuating mechanism 248 has teeth 256 which are engaged by an interference member or locking pawl 258 when the rotary dial combination lock 256 is turned to a locked position using a rotary dial 260. The rotary dial may be rotated clockwise and counterclockwise in a specific combination to unlock the locking mechanism 240 as is known to those skilled in the art of lock design. FIG. 12 shows the rotary dial combination lock 256 in an unlocked position wherein a protrusion 262 of the locking pawl 258 is seated within a groove 264 of the rotary dial combination lock.

Turning now to FIG. 13, a more detailed view of the rotary dial combination lock 256 is shown. The rotary dial combination lock 256 has two or more rotating notched washers 266 with unlocking notches 268 which line up when the rotary dial combination lock is unlocked. A bias member such as leaf spring 270 biases the locking pawl 258 against the notched washers 266, which are rotating when the rotary dial combination lock 256 is in the locked position so as to prevent an alignment of the notches 268 and formation of the groove 264. The locking pawl 258 has a slot 272 which receives a pin 274 therethrough. When the rotating notched washers 266 are lined up the protrusion 262 on the locking pawl 258 is biased into unlocking notches 268. This results in the locking pawl 258 rotating in a counterclockwise direction, as viewed in the figure, around the pin 274, which disengages the locking pawl from the teeth 256 of the brake actuating mechanism 248.

Figure 14:
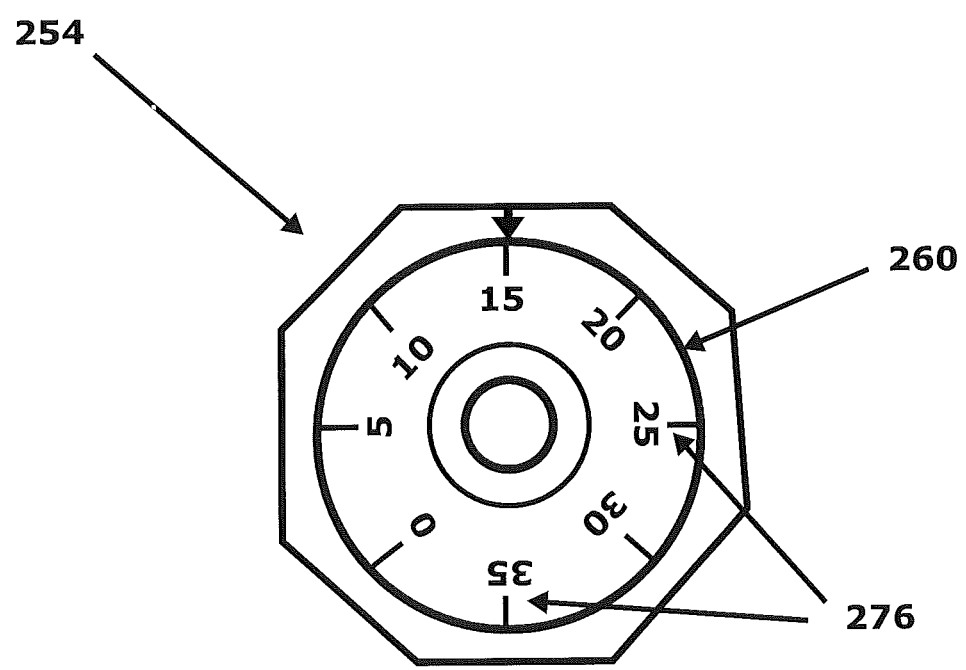
FIG. 14 is a perspective view of a rotary dial combination lock of FIG. 12.

When the rotary dial 260 (best seen in FIG. 14) is turned causing the rotating notched washers 266 to turn to a locked position, the unlocking notches 268 are moved to a position other than shown in FIG. 13. In this locked position the protrusion 262 on the locking pawl 258 is moved away from the washers 266 to cause the locking pawl to rotate clockwise around the pin 274 and engage the teeth 256. The teeth 256 on the brake actuating mechanism 248 are positioned and cut at an appropriate angle so that the brake actuating mechanism can be actuated by rotating brake actuating mechanism clockwise to apply braking when the locking pawl 258 is engaged in the teeth. When the brake actuating mechanism 248 rotates clockwise the locking pawl 258 will rotate in a counterclockwise direction around the point where the protrusion 262 is in contact with the rotating notched washers 266. The slot 272 in the locking pawl 258 facilitates the above-described rotation to take place. Moreover, this structural arrangement allows the locking pawl 258 to move from one tooth 256 to the next which thereby may increase the braking force applied to the vehicle.

The biasing force from the leaf spring 270 causes the locking pawl 258 to rotate clockwise and re-engage the next tooth 256 on the brake actuating mechanism 248. The position and cut of the teeth 256 are such that the brake actuating mechanism 248 is prevented from rotating counter clockwise and discontinuing braking when the locking pawl 258 is engaged in the teeth. Preferably, the contact point for the locking pawl 258 and the teeth 256 are on a line perpendicular to a line between the pin 274 and the point where the protrusion 262 on the locking pawl and the rotating notched washers 266 contact each other.

Returning again to FIG. 14, the rotary dial 260 of the rotary dial combination lock 254 is shown. The rotary dial has indices 276 that provide visual markings for a user to rotate the rotary dial 260 and lock or unlock the rotary dial combination lock 254.

Figure 15A:
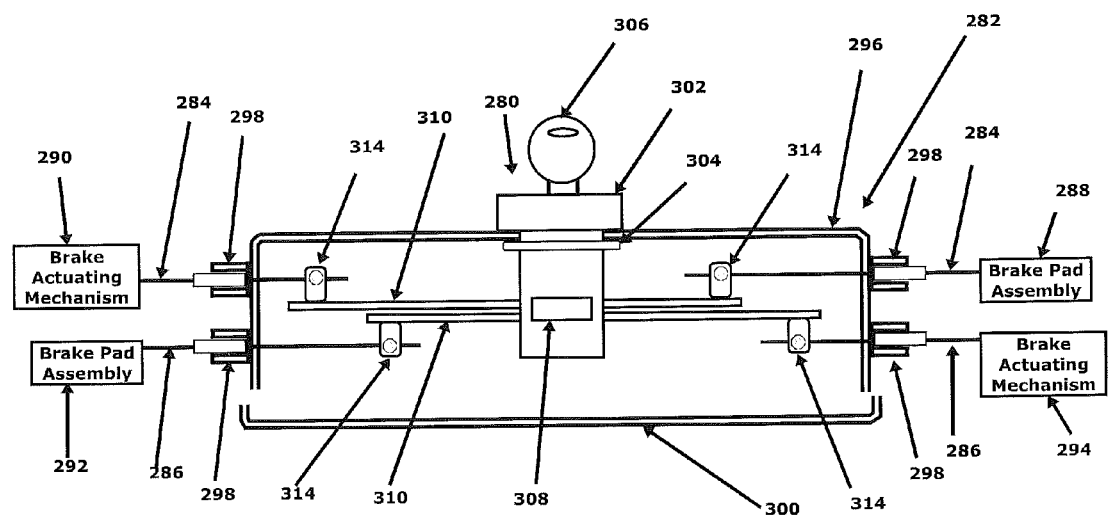
FIG. 15A is a side view of a brake housing and locking mechanism according to a seventh embodiment of the invention.
Figure 15B:
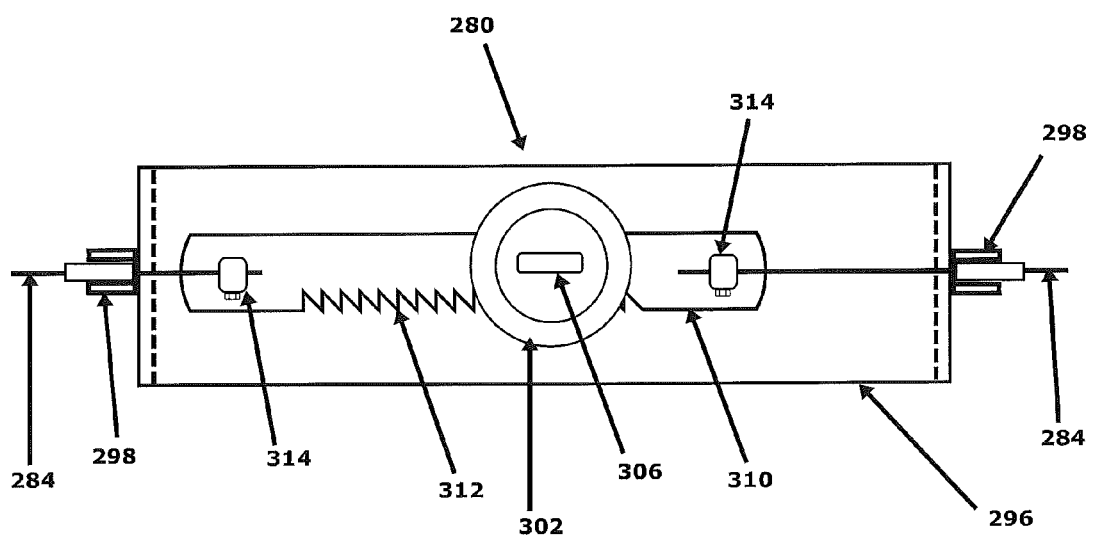
FIG. 15B is a top view of the brake housing and locking mechanism of FIG. 15A.
Figure 16:
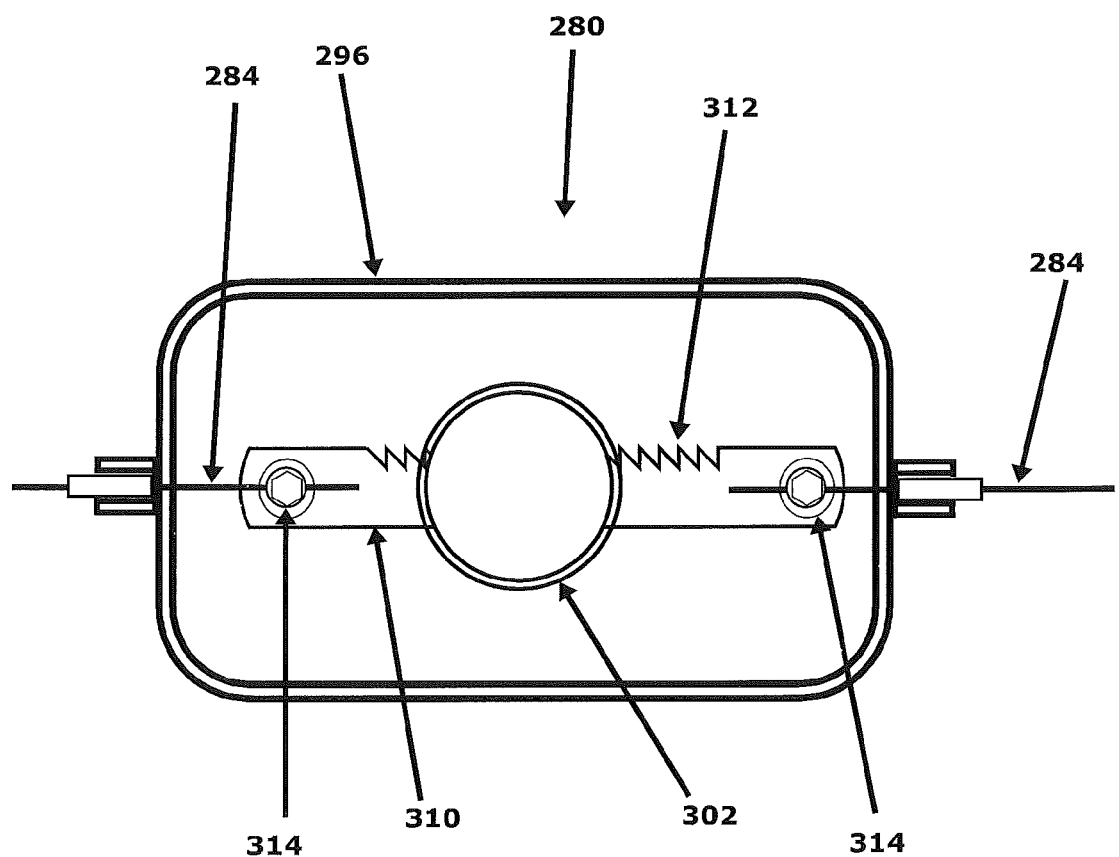
FIG. 16 is a perspective view of the internal components of the anti-theft device of the seventh embodiment of the present invention.

Turning now to FIGS. 15A, 15B and FIG. 16, another embodiment of an anti-theft device 282 including a locking mechanism 280 is shown. FIG. 15A shows a side view, and FIG. 15B shows a top view of FIG. 15A of the anti-theft device 282. In this embodiment, the anti-theft device 282 is installed on a bicycle 20 (FIG. 1) such that both front and rear brake cables 284, 286 can be attached to the locking mechanism 280. The anti-theft device 282 is preferably mounted on the front of the bicycle 20 near the handlebar assembly 46.

The front brake cable 284 is secured to a front brake pad assembly 288 and a front brake actuating mechanism 290. Similarly, the rear brake cable 286 is secured to a rear brake pad assembly 292 and a rear brake actuating mechanism 294. A housing 296 has brake lock support members 298 that receive respective portions of the front and rear brake cables 284, 286. The housing 296 also includes a cover 300 that attaches to the remaining portion of the housing 296. Since the brake cables 284, 286 are integrated with the housing 296, the brake cables 284, 286 would no longer provide the compressive force required for proper braking function of the vehicle should the integrity of the housing 296 be compromised by an attempted theft of the vehicle.

The locking mechanism 280 includes a shell 302 that is attached to the housing 296 by a fastener 304. A key 306 is rotatable within the shell 302 to lock and unlock the locking mechanism 280, and operates similar to the above-described key locking mechanism embodiments. The locking mechanism 280 is connected to an interference member 308, and includes a pair of locking slide members 310 configured to engage the interference member. Each of the locking slide members 310 has teeth 312 (FIG. 15B, one set of teeth shown) which engage the interference member 308 to prevent sliding of the locking slide members 310 in the locked position of the locking mechanism 280. The teeth 312 are disengaged from the interference member 308 in the unlocked position of the locking mechanism 280, which permits sliding of the locking slide members 310 through the shell 302 of the locking mechanism. Each of the locking slide members 310 further includes a pair of distally opposed attachment mechanisms 314 for attaching the brake members of brake cables 284, 286 to the locking slide members 310.

In operation, a portion of the locking slide members 310 pass through the shell 302 of the locking mechanism 280 when the brake cables 284, 286 are actuated in the unlocked position. Thus, normal braking of the vehicle may occur. When the bicycle is braked and then the locking mechanism 280 is placed in the locked position, the locking slide members 310 are prevented from moving relative to the shell 302. In this position, the interference member 308 engages the teeth 312 as the key 306 is rotated to the locked position which continuously slows or stops the bicycle until the key is rotated to the unlocked position.

FIG. 16 shows the cover 300 removed from the brake housing 296. The cover 300 is installed after the brake cables 284, 286 are attached to the locking slide members 310. The cover 300 protects the internal components of the locking mechanism 280. When the bicycle is braked and the locking mechanism 280 is then locked, the locking slide members 310 cannot move and the brake system remains in a braking position. This prevents theft of the bicycle since the bicycle may not be operated in a normal manner. As shown, this embodiment of the invention has a key locking mechanism, although any other type of locking mechanism is contemplated. Also as shown, the brake members of the brake cables 284, 286 are cut and replaced by the locking slide members 310, it is contemplated that the brake members of the brake cable 284, 286 could be uncut and the anti-theft device would function with the locking slide members 310 attached to and moving with one or more brake members of the brake cables 284, 286 as the vehicle brakes are applied and released.

Some advantages of the present invention include, without limitation, its simplicity, including ease of manufacture, ease of installation at a place of manufacture, minimal design changes needed to current vehicle designs to incorporate the locking mechanism, ease of installation of the locking mechanism by a retailer or end-user and most importantly ease of use by the vehicle user. The design makes it easy to quickly lock the vehicle when the vehicle user will be leaving the vehicle unattended for periods of time. The designs also provide for a second line of defense against theft when incorporated with existing vehicle lock technology, thereby discourage theft of the vehicle.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. An anti-theft device for a vehicle, the vehicle having a wheel and a manually-actuated brake system configured to slow or stop the wheel, the manually-actuated brake system having a brake actuating mechanism and a brake pad assembly connected via a brake cable, the brake pad assembly configured to engage the wheel upon actuation of the brake actuating mechanism to a braking position and disengage the wheel upon actuation of the brake actuating mechanism to a non-braking position, the anti-theft device configured to be permanently installed to the vehicle, comprising:
- a locking mechanism comprising one or more locking slide members, wherein the one or more locking slide members is each defined by a body extending from a first end to a second end, the first end connected to the brake cable secured to the brake pad assembly and the second end connected to the brake cable secured to the brake actuating mechanism, the locking mechanism configured to have a locked position and an unlocked position; and
- an interference member connected to the locking mechanism, wherein the one or more locking slide members is positioned within the interference member such that the one or more locking slide members is configured not to move within the interference member when the locking mechanism is in the locked position and the one or more locking slide members is configured move within the interference member when the locking mechanism is in the unlocked position.

2. The anti-theft device for a vehicle according to claim 1, wherein the locking mechanism is a lock operable with a key that is configured to lock and unlock at least two locking slide members.

3. The anti-theft device for a vehicle according to claim 1, wherein the anti-theft device is permanently installed on a bicycle.

4. The anti-theft device for a vehicle according to claim 1, wherein the anti-theft device is installed to the vehicle by replacing a portion of the manually-actuated brake system.

5. The anti-theft device for a vehicle according to claim 4, wherein the portion of the manually-actuated brake system is the brake cable.

6. The anti-theft device for a vehicle according to claim 1, wherein each of the one or more locking slide members includes locking teeth engaged by the interference member in the locked position and the locking teeth disengaged by the interference member in the unlocked position.

7. The anti-theft device for a vehicle according to claim 1, wherein the locking mechanism is transitioned between the locked position and the unlocked position using a key.

8. The anti-theft device for a vehicle according to claim 1, wherein the locking mechanism is transitioned between the locked position and the unlocked position using a combination lock.

9. The anti-theft device for a vehicle according to claim 1, wherein the anti-theft device is permanently installed on the vehicle without replacing any component of the vehicle.

10. An anti-theft device for a vehicle, the vehicle having a wheel and a manual brake system configured to slow or stop the wheel, the manual brake system having a brake housing including a brake actuating mechanism and a brake pad assembly connected via a brake cable, the brake pad assembly configured to engage the wheel upon actuation of the brake actuating mechanism to a braking position and disengage the wheel upon actuation of the brake actuating mechanism to a non-braking position, the anti-theft device comprising:
- a locking mechanism connected to the brake housing, said locking mechanism including a rotary dial combination lock provided with a plurality of washers having notches, said locking mechanism having a locked position and an unlocked position;
- an interference member connected to said locking mechanism, said interference member including a protrusion, wherein said notches of said locking mechanism are configured not to receive said protrusion of said interference member in the locked position such that said locking mechanism is configured to engage the manual brake system and prevent operation of the brake actuating mechanism and said notches of said locking mechanism are configured to receive said protrusion of said interference member in the unlocked position such that said locking mechanism is configured to disengage the manual brake system and allow uninterrupted operation of the brake actuating mechanism; and
- a bias member including a spring, said bias member biasing said interference member away from the brake actuating mechanism in the unlocked position.

11. An anti-theft device for a vehicle, the vehicle having a wheel and a manual brake system configured to slow or stop the wheel, the manual brake system including a brake actuating mechanism and a brake pad assembly connected via a brake cable, the brake pad assembly configured to engage the wheel upon actuation of the brake actuating mechanism to a braking position and disengage the wheel upon actuation of the brake actuating mechanism to a non-braking position, the anti-theft device comprising:
- a locking mechanism having a locked position and an unlocked position, said locking mechanism including a rotary dial combination lock, said rotary dial combination lock comprising:
  - a pin connected to the brake housing;
  - a locking pawl having an aperture for receiving said pin therethrough, said locking pawl pivotable about said pin, said locking pawl including an end configured to engage notches of the brake actuating mechanism and a protrusion configured to engage said rotary dial combination lock;
- a bias member connected to the brake housing and said locking pawl, said bias member biasing said locking pawl toward said rotary dial combination lock in an unlocked position of said locking mechanism,
- an interference member connected to said locking mechanism, said locking mechanism in the locked position configured to engage the manual brake system and prevent operation of the brake actuating mechanism and said locking mechanism in the unlocked position configured to disengage the manual brake system and allow uninterrupted operation of the brake actuating mechanism.

* * * * *